US012798615B2

(12) United States Patent
Lee et al.

(10) Patent No.: US 12,798,615 B2
(45) Date of Patent: Nov. 17, 2026

(54) BIASED TRAJECTORY SELECTION BY A PLANNING SYSTEM

(71) Applicant: Zoox, Inc., Foster City, CA (US)

(72) Inventors: Seungji Lee, San Carlos, CA (US); Gary Linscott, Seattle, WA (US); Marc Wimmershoff, Redwood City, CA (US)

(73) Assignee: Zoox, Inc., Foster City, CA (US)

(*) Notice: Subject to any disclaimer, the term of this patent is extended or adjusted under 35 U.S.C. 154(b) by 149 days.

(21) Appl. No.: 18/741,430

(22) Filed: Jun. 12, 2024

(65) Prior Publication Data

US 2025/0381987 A1 Dec. 18, 2025

(51) Int. Cl.
*B60W 60/00* (2020.01)
*B60W 50/00* (2006.01)

(52) U.S. Cl.
CPC .... *B60W 60/0013* (2020.02); *B60W 50/0098* (2013.01); *B60W 60/0015* (2020.02); *B60W 2050/0022* (2013.01); *B60W 2554/802* (2020.02); *B60W 2556/40* (2020.02)

(58) Field of Classification Search
CPC ......... B60W 60/0013; B60W 50/0098; B60W 60/0015; B60W 2050/0022; B60W 2554/802; B60W 2556/40
See application file for complete search history.

(56) References Cited

U.S. PATENT DOCUMENTS

2016/0129907 A1 5/2016 Kim et al.
2018/0143641 A1* 5/2018 Rao .................... G01C 21/3469
2018/0292222 A1* 10/2018 Lin ........................ B60W 40/04
2019/0265060 A1* 8/2019 Han .................... G01C 21/3407
2022/0128370 A1* 4/2022 Srinivasan ......... G01C 21/3461
2022/0169278 A1* 6/2022 Refaat ................. B60W 60/001
2025/0050895 A1* 2/2025 Takahashi ............. B60W 50/06

FOREIGN PATENT DOCUMENTS

JP 2009264880 A 11/2009
KR 20200119389 A 10/2020
KR 20230153885 A 11/2023

OTHER PUBLICATIONS

Sombit, et al., “Learning whom to trust in navigation: dynamically switching between classical and neural planning”, retrieved on Sep. 18, 2025 at <https://arxiv.org/abs/2307.16710>, arXiv:2307.16710, Jul. 31, 2023, pp. 1-8.
Search Report and Written Opinion for International Application No. PCT/US2025/031736, Dated Oct. 1, 2025, 10 pages.

* cited by examiner

*Primary Examiner* — Toya Pettiegrew
(74) *Attorney, Agent, or Firm* — Lee & Hayes, P.C.

(57) ABSTRACT

Techniques for determining a planned trajectory usable to control a vehicle in an environment are discussed herein. A computing device can receive multiple planned trajectories generated by different models, and determine to use one of the planned trajectories to control the vehicle at a future time. The models can represent machine learned models that are independently trained using different training data and one of the models may leverage human driving data during training. The techniques can also include determining a bias value to cause the vehicle to utilize a planned trajectory from a set of available planned trajectories.

20 Claims, 5 Drawing Sheets

BIASED TRAJECTORY SELECTION BY A PLANNING SYSTEM

BACKGROUND

Machine learned models can be employed to predict an action for a variety of robotic devices. For instance, planning systems in autonomous and semi-autonomous vehicles determine actions for a vehicle to take in an operating environment. Actions for a vehicle may be determined based in part on avoiding objects present in the environment. For example, an action may be generated to yield to a pedestrian, to change a lane to avoid another vehicle in the road, or the like. Accurately predicting actions for the vehicle to operate in the environment enables the vehicle to safely operate in the vicinity of the objects.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
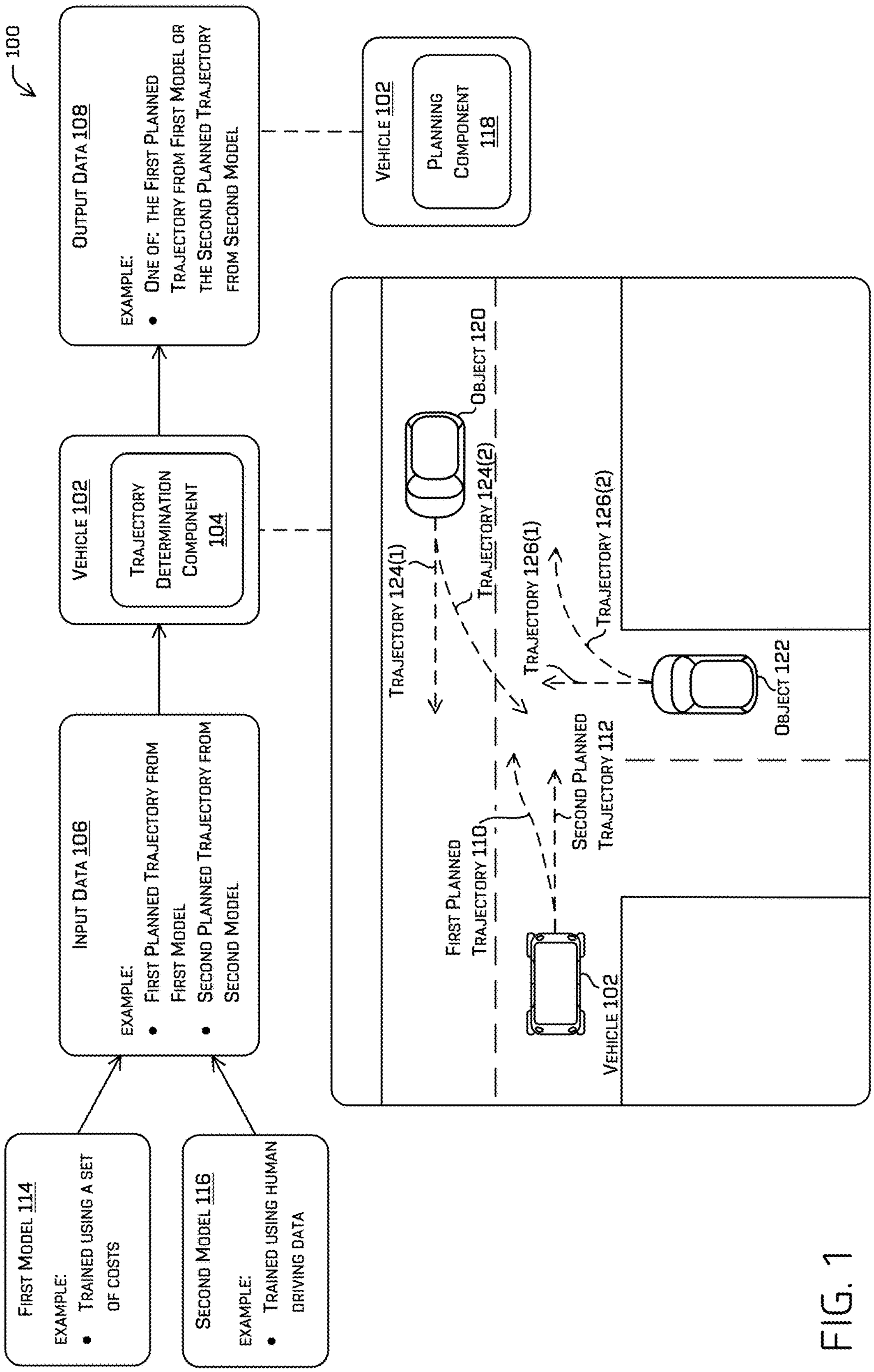
FIG. 1 is an illustration of an example environment, in which an example vehicle applies a trajectory determination component to determine a planned trajectory.

This application describes techniques for determining a planned trajectory usable to control a vehicle in an environment. For example, a computing device can receive multiple planned trajectories generated by different models, and determine to use one of the planned trajectories to control the vehicle at a future time. A first model can, for instance, represent a cost-based model and a second model can represent a human-based driving model. In some examples, the models can represent machine learned models that are independently trained using different training data with at least one of the models leveraging human driving data during training. In some examples, the computing device can implement a trajectory determination component that determines which of the multiple planned trajectory for the vehicle to use at a future time based on a bias value that causes a preference to one of the planned trajectories. The bias value can, for example, represent a weight applied to one of the planned trajectories based on a variety of input data such as sensor data, map data, simulation data, etc. The computing device can determine the bias value over time as the vehicle operates in the environment to cause the vehicle to utilize a planned trajectory from a model that is trained for a specific scenario and/or region in the environment. Using the techniques described herein, a vehicle may receive the planned trajectory from the trajectory determination component that is usable by the vehicle to quickly and/or preemptively avoid objects, thereby improving safety of the vehicle.

In some examples, the computing device can implement the trajectory determination component to select, predict, generate, or otherwise determine a trajectory from a set of trajectories received as input. The set of trajectories can include a first planned trajectory output by a first optimization, component or model (e.g., a first machine learned model) and a second planned trajectory output by a second optimization, component or model (e.g., a second machine learned model). In some examples, the first machine learned model can be trained to determine the first planned trajectory based on first training data (e.g., aggregated costs associated with different features of an environment using a heuristic, a tree search, and/or a mathematical algorithm). The second machine learned model can be trained to determine the second planned trajectory based on second training data different from the first training data. For instance, the second trained data can include human driving data indicative of how a human driver behaves in a particular location of the environment. The human driving data may be absent from the first training data, and/or the second training data may not include at least some of the cost information associated with the first training data. By providing different training data, the machine learned models can provide the trajectory determination component with planned trajectories that represent different vehicle behavior.

Once trained, the first machine learned model and the second machine learned model can, in various examples, be included in a vehicle computing device to generate planned trajectories as the vehicle operates in an environment. By training the machine learned model as described herein, a trajectory determination component can receive the planned trajectories representing different potential vehicle behaviors, and determine to use the planned trajectory that is safest for the vehicle in the future. In various examples, the trajectory determination component can determine a bias value for one of the planned trajectories based on receiving sensor data, map data, or the like, over time as the vehicle operates in the environment enabling the vehicle access to predictions from differently trained machine learned models.

In some examples, a same or different model component can perform a simulation using each of the planned trajectories to determine costs associated with implementing each of the planned trajectories in the future. For example, the determined costs can include an intersection cost, a safety cost, a progress cost, and/or a comfort cost, though other costs may also or instead be used. The trajectory determination component can compare the costs associated with each of the planned trajectories one to another, to output the planned trajectory having a lowest cost or set of costs. In some examples, the trajectory determination component can apply a weight to "bias" or cause selection of one of the planned trajectory as output data.

In some examples, the output data can be transmitted to another model or component of the vehicle computing device (e.g., a prediction component or a planning component) to determine acceleration, braking, and/or steering actions for the vehicle to follow in the future. For example, a planning component of the vehicle computing device can determine output data representing a position, velocity, acceleration, etc. for one or more objects that can affect the vehicle using the planned trajectory associated with the output data.

The first machine learned model and second machine learned model can require different computational resources to generate an output, and the techniques describes herein can include operating the first and second machine learned models at a same time (e.g., in parallel or substantially in parallel, within technical tolerances) while making efficient use of available computational resources. For example, the first machine learned model can require a different amount of computational resources (e.g., processor resource, memory resource, etc.) than the second machine learned model. In various examples, the first machine learned model can determine the first planned trajectory based on analyzing cost information associated with multiple trajectories whereas the second machine learned model can determine the second planned trajectory independent of the cost information thereby enabling the second machine learned model to generate an output using fewer computational resources than the first machine learned model.

In some examples, the trajectory determination component can select one of the first planned trajectory or the second planned trajectory based on one or more criteria. The criteria can include first cost information resultant from performing a first simulation using the first planned trajectory and second cost information resultant from performing a second simulation using the second planned trajectory. The first cost information and the second cost information can include a corresponding progress cost, intersection cost (e.g., value indicating a likelihood that the vehicle and an object intersect), safety cost, or the like, which may be compared one to another. The trajectory determination component may also determine a bias value that modifies a weight associated with the first cost information and/or the second cost information. The bias value may be determined based on sensor data from one or more sensors associated with the vehicle, map data indicating crosswalks, construction zones, state data indicating a position or other state of the vehicle and/or an object), etc. Additional description of the trajectory determination component can be found throughout this disclosure including in FIGS. 1-3.

Data output by the trajectory determination component can be used in a variety of ways. For example, output data representing a vehicle trajectory can be transmitted to a computing device (or component thereof) configured to control an autonomous vehicle. For example, a planned trajectory can be transmitted to a planning component of a vehicle computing device that is configured to determine planning data (e.g., a vehicle trajectory, an object trajectory, an output by a decision tree, etc.). In some examples, the output data by the trajectory determination component can be used to perform a simulation, control a vehicle, validate or test performance of a vehicle or component thereof, among others.

The techniques described herein enable an autonomous vehicle to safely plan for scenarios such as potential interactions with objects (e.g., a vehicle, a pedestrian, a bicyclist, etc.), traffic sign interactions, a lane change, etc. For instance, the computing device can determine an action (e.g., a braking action, an acceleration action, a trajectory, etc.) for the autonomous vehicle based on an output from the trajectory determination component. In some examples, the output data may be used in a decision tree to control the autonomous vehicle by including the planned trajectory as a reference action in a decision tree. The planned trajectory output by the trajectory determination component can improve vehicle planning operations by enabling more realistic reference actions from a particular model to be included in a decision tree.

In various examples, controlling the vehicle may comprise stopping the vehicle and/or controlling at least one of: a braking system, an acceleration system, or a drive system of the vehicle. Additionally, or alternatively, controlling the vehicle may comprise adjusting a setting or parameter associated with a component or model of a vehicle computing device.

In various examples, aspects of the processing operations may be parallelized and input to a parallel processor unit such as in parallel by a GPU and/or in parallel by multiple GPUs for efficient processing. Accordingly, implementing the techniques described herein can efficiently make use of available computational resources (e.g., memory and/or processor allocation or usage) while also improving accuracy of predictions.

In some examples, a model or component may define processing resources (e.g., processor amount, processor cycles, processor cores, processor location, processor type, and the like) to use to predict a planned trajectory for a vehicle to use at a future time. For example, a vehicle computing device can implement various models that may have access to different processors (e.g., Central Processing Units (CPUs), Graphics Processing Units (GPUs), Tensor Processing Units (TPUs), multi-core processor, and the like). Models may define processing resources to utilize a processor that most efficiently (e.g., uses the least amount of computational time) outputs a prediction. In some examples, a model may generate a set of action trajectories by processing data associated with the object and/or the vehicle using a CPU, GPU, TPU, or a combination thereof. In this way, the model may be defined to utilize the processing resources that enable the model to perform predictions in the least amount of time (e.g., to use the selected planned trajectory in planning considerations of the vehicle). Accordingly, a model may make the best use of available processing resources and enable more predictions that may improve how a vehicle navigates in relation to the objects.

As described herein, models may be representative of machine learned models, statistical models, heuristic models, or a combination thereof. That is, a model may refer to a machine learning model that learns from a training data set to improve accuracy of an output (e.g., a prediction). Additionally or alternatively, a model may refer to a statistical model that is representative of logic and/or mathematical functions that generate approximations which are usable to make predictions.

The techniques discussed herein can improve a functioning of a computing device of a vehicle in a number of ways. For example, the trajectory determination component may identify which available planned trajectory prevents unneeded actions by the vehicle, and/or improves predictions related to the behavior of the vehicle. In some examples, the trajectory selector improves functioning and safety of the vehicle by preventing the vehicle from taking additional actions that are not required based on conditions in the environment around the vehicle. In addition, the techniques described herein can improve passenger comfort and/or vehicle safety such as, for example, avoiding sudden braking or swerving when not needed. The techniques may also or instead cause the vehicle to determine a trajectory from a model that is trained for a specific scenario, region, or object type.

The techniques can include the trajectory selector optimizing available computational resources by performing operations that limit the impact on the available resources (as compared to not implementing the model). Utilizing output data from the trajectory determination component by a vehicle computing device, for instance, can improve the accuracy and/or reduce a latency for the vehicle to respond to a potential collision in the environment.

In various examples, implementing the trajectory determination component can improve safety of a vehicle by efficiently outputting an optimal planned trajectory for consideration during planning operations. In some examples, the techniques provide determining the planned trajectory from a set of available planned trajectories to ensure that additional, and potentially safer, trajectories are considered during planning operations.

The techniques described herein can be implemented in a number of ways. Example implementations are provided below with reference to the following figures. Although discussed in the context of an autonomous vehicle, the methods, apparatuses, and systems described herein can be applied to a variety of systems and is not limited to autonomous vehicles. In another example, the techniques can be utilized in an aviation or nautical context, or in any system using sensor data. Additionally, the techniques described herein can be used with real data (e.g., captured using sensor(s)), simulated data (e.g., generated by a simulator), or any combination of the two.

FIG. 1 is an illustration of an example environment 100, in which an example vehicle applies a trajectory determination component to determine a planned trajectory. For example, the vehicle 102 can implement a trajectory determination component 104 to determine a planned trajectory from a set of planned vehicle trajectories. As illustrated, the trajectory determination component 104 receives input data 106 representing planned trajectories, sensor data, state data, map data, log data, etc. usable to determine output data 108. The output data 108 can represent a vehicle trajectory (e.g., a candidate trajectory, a planned trajectory, etc.) usable to control the vehicle 102 in the environment 100. In some examples, the planning techniques described herein may be implemented at least partially by or in association with a vehicle computing device (e.g., vehicle computing device 404 of FIG. 4) and/or a remote computing device (e.g., computing device(s) 436 of FIG. 4).

In some examples, the trajectory determination component 104 can receive a first planned trajectory 110 and a second planned trajectory 112 as some or all of the input data 106. For example, a first model 114 can output the first planned trajectory 110 and a second model 116 can output the second planned trajectory 112. The first model 114 and the second model 116 can represent machine learned models that receive sensor data, map data, log data, etc. to determine the respective planned trajectory.

In various examples, the first model 114 and the second model 116 are determined using different approaches (e.g., differing training data for machine learned models, different models entirely, different processes, etc.) thereby causing the first planned trajectory 110 and the second planned trajectory 112 to represent different vehicle actions or behaviors. In some examples, the first model 114 can represent a first machine learned model that is trained to determine the first planned trajectory 110 based on first training data representing aggregated costs associated with various features of an environment. The second model 116 can, for example, be trained to determine the second planned trajectory 112 based on second training data different from the first training data. For instance, the second trained data can include human driving data indicative of how a human driver operates in the environment. The human driving data associated with the second training data may be absent from the first training data, for example. Additionally, or alternatively, the second training data may not include the aggregated costs of the first training data. In some examples the first model and the second model may be trained with the same data but the architecture of the models may differ. In other examples, a first model can be a heuristic or rules-based model and a second model can be a machine learned model. Of course, these are examples and additional examples are provided throughout the disclosure.

In some examples, the trajectory determination component 104 can determine a bias value based at least in part on the input data 106. For example, the bias value can be determined based on presence of a region (e.g., the vehicle 102 is within a threshold distance of a construction zone, a school zone, a crosswalk, etc.) in the environment 100. The bias value may also or instead be determined based on the vehicle 102 being proximate a threshold number of objects (e.g., to bias selection towards the second planned trajectory 112 from the second model 116 to leverage human driving behavior. Additionally, or alternatively, the trajectory determination component 104 can determine the bias value based on vehicle performance using historical bias values in a simulated environment and/or real-world environment. In various examples, bias values can be used as input data and/or as training data to improve bias value determinations over time. For example, a planned trajectory associated with a human-driver trained model can be implemented by the vehicle based on a position of the vehicle being within a threshold distance of region (e.g., construction zone, etc.).

By way of example and not limitation, the vehicle 102 can implement the trajectory determination component 104 to change between using a planned trajectory output from one of a set of different models to improve vehicle safety, and/or to make efficient use of available computational resources. For example, the first planned trajectory 110 may be advantageous relative to the second planned trajectory 112 in a first set of scenarios whereas the second planned trajectory 112 may be advantageous relative to the first planned trajectory 110 in a second set of scenarios. The trajectory selector can continuously determine bias values for new sets of planned trajectories received as input from a first time to a second time. In various examples, a machine learned model (or other model or component) can determine a bias value based at least in part on a representation of the scenario (e.g., how a simulated vehicle performs in a simulation environment).

In various examples, a vehicle computing device associated with the vehicle 102 may be configured to detect one or more objects such as object 120 and object 122 (e.g., via a perception component). In some examples, the vehicle computing device may detect the objects, based on sensor data received from one or more sensors (e.g., a lidar sensor, a radar sensor, a camera, etc.). In some examples, the sensors may include sensors mounted on the vehicle 102, and include, without limitation, ultrasonic sensors, radar sensors, light detection and ranging (lidar) sensors, cameras, microphones, inertial sensors (e.g., inertial measurement units, accelerometers, gyros, etc.), global positioning satellite (GPS) sensors, and the like.

In some examples, the sensors may include one or more remote sensors, such as, for example sensors mounted on another autonomous vehicle, and/or sensors mounted in the environment 100. In various examples, the vehicle 102 may be configured to transmit and/or receive data from other autonomous vehicles (e.g., one or more autonomous vehicles in a fleet) and/or the sensors. The data may include sensor data, such as data regarding the objects detected in the environment 100. In some examples, the sensors may be mounted in the environment 100 to provide additional visibility in an area of reduced visibility.

In various examples, the vehicle computing device can receive the sensor data and can semantically classify the detected objects (e.g., determine an object type), such as, for example, whether the object is a vehicle such as the objects 120 and 122, a pedestrian, a building, a truck, a motorcycle, a moped, or the like. The objects may include static objects (e.g., buildings, bridges, signs, etc.) and dynamic objects such as other vehicles, pedestrians, bicyclists, or the like. In some examples, a classification may include another vehicle (e.g., a car, a pick-up truck, a semi-trailer truck, a tractor, a bus, a train, etc.), a pedestrian, a child, a bicyclist, a skateboarder, an equestrian, an animal, or the like. In various examples, the classification of the object may be used by a model to determine object characteristics (e.g., maximum speed, acceleration, maneuverability, etc.). In this way, potential actions by an object may be considered based on characteristics of the object (e.g., how the object may potentially move in the environment).

The trajectory determination component 104 can, in various examples, receive the input data 106 comprising one or more of: sensor data, map data, log data (including historical performance associated with various bias values at one or more times), vehicle state data, and object state data, classification data, prediction data, planner data, and/or environmental data, just to name a few. The input data 106 may represent, for example, a vehicle state (position, velocity, acceleration, trajectory, etc.), the object state (position, velocity, acceleration, trajectory, etc.), and/or environmental features based on the map data and/or safety thresholds (e.g., a safety range) for a speed, an acceleration action, a steering action, and/or a braking action. By way of example and not limitation, vehicle state data associated with the vehicle can comprising one or more of: position data, orientation data, heading data, velocity data, speed data, acceleration data, yaw rate data, or turning rate data. In some examples, the input data 106 may indicate (or be used to determine) presence of a region such as a construction zone, a school zone, a crosswalk, a highway, or other region in the environment 100.

In some examples, the trajectory determination component 104 can represent one or more models configured to process the input data 106 to determine a single vehicle trajectory for the vehicle 102 to follow in the environment 100 relative to the objects 120 and 122. For instance, the trajectory determination component 104 can determine the output data 108 representing one of: the first planned trajectory 110 or the second planned trajectory 112 based at least in part on one or more criteria. The one or more criteria can include object information such as a number of objects, type of object(s), etc. in the environment 100, vehicle information such as a position, velocity, yaw, etc. of the vehicle 102, environmental data such as weather, ambient light, time of day, time of year, etc., map data such as static features, traffic rules, and so on.

In various examples, the one or more criteria can represent a bias value usable by the trajectory determination component 104 to determine the output data 108. The trajectory determination component 104 can determine the bias value in a variety of ways to cause preference towards one of the trajectories included in the input data 106. For instance, the bias value can change over time to cause one of the vehicle trajectories to be determined based on sensor data, map data, etc. In some examples, the bias value can be used to indicate which model produces a trajectory for a given scenario in the environment 100 (e.g., junction type, number of objects, etc.). Historical model performance in various scenarios can be considered in examples to improve bias value determinations over time.

The trajectory determination component 104 can, in some example, represent a machine learned model configured to determine a bias value based on input from a device (or user thereof) indicating a preference to use a particular model of a set of available models to cause a desired vehicle behavior. In various examples, the bias value can be determined based on a user input received from a user interface at a previous time. The input from the device (or user) can indicate a mapping between scenarios and model(s) that produce an optimal trajectory for a scenario or region. In various examples, the bias value may be updated over time as new scenarios are encountered, new bias values are used and evaluated, and/or new input from the device or the user is received. The trajectory determination component 104 can, for example, increase the bias value to increase a likelihood that an output from the particular model is determined at a particular time.

In various examples, the first model 114 may be configured to aggregate costs associated with one or more heat maps to determine the first planned trajectory 110 for the vehicle 102. For instance, a vehicle computing device can implement the first model 114 to determine heat maps and respective cost information for different features of the environment based on sensor data. In various examples, the vehicle computing device can combine the heat maps and associated costs to output a planned trajectory for the vehicle. The first model 114 can receive feature information describing vehicle safety, a vehicle state, an object state, and/or a control policy, and generate a heat map for each feature included in the future information. The model can aggregate the costs associated with the different features using a heuristic, a tree search, and/or a mathematical algorithm.

Some example costs include: a follow cost, a lane change cost, a blinker cost, a progress cost, a safety cost, an obstacle cost, an interaction cost, an active object cost (e.g., a cost for the object to avoid the vehicle 102), an inactive object cost, a pedestrian cost, previous vehicle state cost, sensor error cost (e.g., error in pose and/or localization), an animal cost, a bicyclist cost, a light indicator cost (e.g., a taillight or other light of the vehicle or another object), a road network cost, a model cost, and the like. The model cost can represent, for example, a level of confidence in an output by the model and/or an indication of training data used to train the model. The model cost can, for example, be based on a type of training data used to train a machine learned model (e.g., different model costs for whether or not log data, sensor data, map data, and/or another data type is used to train a particular model). Any of the above example costs can therefore be encoded into the one or more heat maps (e.g., the heat map can account for sensor error, inactive objects like traffic cones, street signs, buildings, etc. as well as how much effort an active object may take to avoid the vehicle 102.

The first model 114 of the vehicle computing device can combine costs associated with different features in a variety of ways. For instance, the first model 114 can receive sensor data representing the environment and feature data associated with a region in the environment and/or a control policy for the vehicle (e.g., stay in lane, change lane, operate blinker, brake, accelerate, and so on). The first model 114 can, in some examples, determine a heat map for some or all of the features in the feature data based on the sensor data. Each heat map can be associated with a set of costs, and the model can combine the sets of costs of the heat maps using a heuristic and/or an algorithm. For example, the first model 114 can perform a tree search of the combined costs to determine the planned trajectory for the vehicle in the future. In some examples, the first model 114 may apply a heuristic to the tree search to cause different amounts of processing for branches associated with different features and/or potential trajectories. In various examples, the first model 114 can perform the tree search of the costs (e.g., follow cost, lane change cost, blinker cost, progress cost, safety cost, obstacle cost, interaction cost, etc.) to select or otherwise determine the planned trajectory from a set of trajectories. Additional examples of a model using costs to determine a planned trajectory can be found, for example, in U.S. patent application Ser. No. 17/897,111 titled "Automatic Parameter Determination System" filed Aug. 27, 2022, and U.S. patent application Ser. No. 16/218,182 titled "Action Reference Generation Pipeline" filed May 31, 2023, the entireties of which are herein incorporated by reference for all purposes.

The second model 116 can generate the second planned trajectory 112 at approximately a same time as the first model 114 generates the first planned trajectory 110. In various examples, the second model 116 can use fewer available computational resources than the first model 114 to generate a respective planned trajectory. The second model 116 can be trained using driving data derived from one or more human drivers and therefore represents actions with consideration to objects in the environment 100.

In some examples, the vehicle computing device can control operation of the vehicle 102 based on the output data 108 while in other examples, the trajectory determination component 104 can send the output data 108 to another component or model of the vehicle computing device (e.g., a planning component 118), or a remote computing device, to train model(s) to improve predictions. In various examples, the output data 108 can be used in a decision tree to determine an action for the vehicle (e.g., the planned trajectory can represent a node of the decision tree). In some examples, the planning component 118 can represent the planning component 426 of FIG. 4.

In some examples, the planning component 118 can determine one or more object trajectories based at least in part on the output data (e.g., the determined trajectory). FIG. 1 depicts the object 120 comprising trajectory 124(1) and trajectory 124(2) and the object 122 comprising trajectory 126(1) and trajectory 126(2), though other numbers of objects and/or object trajectories may be determined in other examples.

In various examples, the trajectory determination component 104 can determine the first planned trajectory 110 and/or the second planned trajectory 112 based at least in part the trajectory 124(1), the trajectory 124(2), the trajectory 126(1), or the trajectory 126(2) from the planning component 118.

Figure 2:
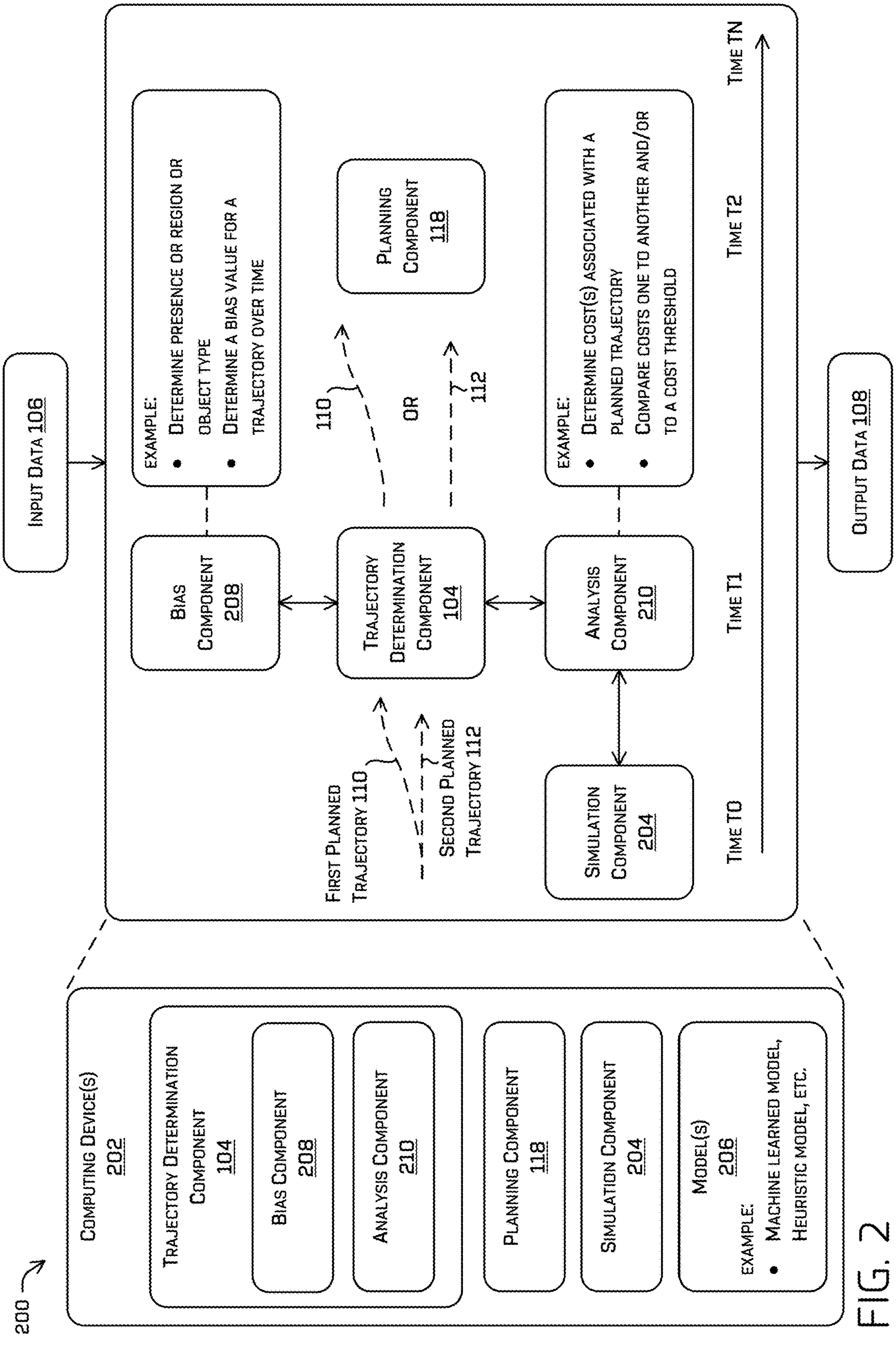
FIG. 2 illustrates an example block diagram of an example computer architecture for implementing techniques to predict a vehicle trajectory, as described herein.

FIG. 2 illustrates an example block diagram of an example computer architecture 200 for implementing techniques to predict a vehicle trajectory, as described herein. The example computer architecture 200 includes one or more computing devices 202 (also referred to as "the computing device 202") comprising the trajectory determination component 104 and the planning component 118 in FIG. 1. As illustrated, the computing device 202 comprises the trajectory determination component 104, the planning component 118, a simulation component 204, and one or more models 206. The trajectory determination component 104 is shown comprising a bias component 208 and an analysis component 210. In some examples, the computing device 202 can represent a vehicle computing device (e.g., vehicle computing device 404) and/or a remote computing device (e.g., computing device(s) 436).

In various examples, the computing device 202 can receive the input data 106 and generate the output data 108 (e.g., one of the planned trajectories). In some examples, the input data 106 can include the first planned trajectory 110 and the second planned trajectory 112 for the vehicle 102 and the trajectory determination component 104 can determine to use one of the planned trajectories based on one or more criteria. In some examples, the computing device 202 can output one of the planned trajectories as a determined trajectory based on processing the input data 106.

The output data 108 can be used in a variety of ways and may be transmitted to a vehicle computing device (or component thereof such as a prediction component) for further processing. The output data 108 may also or instead be used to perform a simulation (e.g., by the simulation component 204) between the vehicle 102 and one or more objects in the environment 100. Additionally, or alternatively, the output data 108 can be used to validate and/or test performance of the vehicle 102 such as to test a vehicle controller.

The simulation component 204 represents functionality to perform a simulation between the vehicle 102 and one or more objects. The simulation component 204 can, for example, perform a simulation with the vehicle 102 using the first planned trajectory 110 and the second planned trajectory 112 and determine costs associated with implementing each of the planned trajectories in the future. For example, the determined costs can include one or more costs for each planned trajectory, and may include an intersection cost indicating a likelihood for an object in the environment to intersect with the vehicle, a safety cost indicating a level of safety associated with a corresponding trajectory, a progress cost indicating an amount of progress by the vehicle using the corresponding trajectory, or a comfort cost indicating a comfort level for a passenger of the vehicle, just to name a few. The simulation component 204 can, in various examples, compare a first cost associated with the first planned trajectory 110 with a second cost associated with the second planned trajectory 112, and output the planned trajectory having a lowest cost or set of costs. In some examples, the trajectory determination component 104 can "bias" selection of one of the planned trajectory by applying the bias value, or weight, to one of the planned trajectories, such as by the analysis component 210.

In some examples, the simulation component 204 can provide functionality to simulate an action of the vehicle 102 and an action of an object (e.g., the object 120 and/or the object 122) at different times in the future. The actions of the vehicle can represent a change in vehicle state (e.g., a change in velocity, acceleration, turn rate, yaw, and so on) from a first time to a second time. In some examples, an example vehicle action can include not changing the vehicle state (e.g., remaining in place such as staying in a lane, keeping a same steering action, braking action, and/or acceleration action). In some examples, the simulation component 204 can initiate an example scenario that represents the change in the vehicle state over time. In such examples, the scenario can include predictions about future positions and/or velocities of the vehicle and/or the object(s) in an environment proximate to the vehicle.

In some examples, the simulation component 204 can simulate possible actions for the vehicle 102 and/or objects (e.g., the objects 120 and 122) over time. The simulation component 204 can determine a vehicle action based at least in part on predicting an object action (e.g., a change in speed, acceleration, braking, etc.) associated with the object. For instance, the vehicle action can include steering, accelerating, and/or braking to avoid the object 120 relative to the object action. For instance, if a vehicle takes a first action at a first time, such as 1 second into the simulation, the simulation component 204 can determine a second action for the vehicle 102 based on the first action taken by the vehicle. In this way, the simulation component 204 can provide functionality to "actively" consider possible actions at each instance of the simulation (e.g., over 4 seconds) similar to how a driver makes decisions when operating a vehicle. In some examples, the simulation component 204 can determine actions for both the vehicle 102 and the objects that are dependent upon previous actions (or the vehicle or another object including object to object actions) as time increases during the simulation.

The simulation component 204 can receive a control policy comprising one or more of: a physics policy, a dynamics policy, a kinematics policy, and/or a rules policy indicating how the vehicle and objects can potentially interact or indicating information about rules of the road such as a right of way associated with a roadway, an intersection, or a navigable surface. In some examples, the simulation component 204 can implement a machine learned model that accesses the control policy to determine trajectories, actions, positions, or other data associated with the vehicle and/or object(s). For instance, the control policy can be used by a machine learned model during a simulation performed by the simulation component 204.

The model(s) 206 may be representative of machine learned models, statistical models, heuristic models, or a combination thereof. The model(s) 206 may refer to a statistical model that is representative of logic and/or mathematical functions that generate approximations which are usable to make predictions. In some examples, the model(s) can represent the first model 114 and/or the second model 116. While shown separating in FIG. 2, functionality associated with the trajectory determination component 104, the planning component 118, the simulation component 204, the model(s) 206, or other components of the computing device 202 may be incorporated into a single model or component. Though described as different models, in some examples, functionality associated with the first model 114 and the second model 116 can be incorporated into a single model. At least one of the model(s) 206 can, for example, output the first planned trajectory 110 or the second planned trajectory 112 for use as the input data 106.

The bias component 208 represents functionality to determine a bias value that "acts" as a weight to cause the trajectory determination component 104 to identify one of the two or more planned trajectories to include as the output data 108. The bias component 208 can, for example, determine the bias value based on detecting presence of a region and/or a particular object type (e.g., a child) to cause selection of a model that performs better than another available model in the region and/or relative to the object type. The bias value can change over time as the computing device 202 receives new input data, for example. In this way, scenarios in which the vehicle 102 might otherwise remain stationary, stay in a blocked lane, etc. can be mitigated by changing the bias value to cause the vehicle 102 to use another trajectory from a different model.

In various examples, the computing device 202 can implement the analysis component 210 to analyze the input data 106. For example, the analysis component 210 can determine differences between results of simulating the first planned trajectory 110 and the second planned trajectory 112 by the simulation component 204. In various examples, the analysis component 210 can compare a first set costs associated with the first planned trajectory 110 with a second set of costs associated with the second planned trajectory 112 in which the first and second sets of costs represent corresponding hierarchies of costs. For example, a first cost in the first and second set of costs can compromise an intersection cost (e.g., a cost indicating a potential for the vehicle 102 and an object to intersect) while a second cost in the hierarchy can comprise a safety cost. Additional costs in a respective hierarchy can be compared one to another up to a threshold number of costs, and the aggregated costs of the first set of costs can be compared to the aggregated costs of the second set of costs. In some examples, the bias value may cause a cost in a set of costs, or the aggregated costs to change value prior to the analysis component 210 performing a comparison.

The analysis component 210 can, in some examples, compare the first cost and the second cost, and generate the output data 108 to include the planned trajectory having a lowest cost. In other examples, the analysis component 210 can compare additional costs in the hierarchy of costs one to another and/or compare the aggregated costs for each planned trajectory one to another. The first set of costs and second sets of costs can include any number of costs, and in a non-limiting example can include an intersection cost, progress cost, safety cost, comfort cost, respectively.

In various examples, the analysis component 210 can determine a difference between the first set of costs and second sets of costs, and generate the output data 108 based on the difference. For instance, the analysis component 210 can determine that the first planned trajectory 110 or the second planned trajectory 112 is safer based on comparing the one or more costs and identifying the planned trajectory having a lowest overall cost (e.g., based on comparing a single cost, or comparing aggregated costs associated with each planned trajectory).

In some examples, the analysis component 210 can receive a bias value from the bias component 208 and adjust one or more costs for the first planned trajectory 110 or the second planned trajectory 112. The analysis component 210 can adjust (e.g., increase or decrease) the first cost or the second cost or any cost in the first set of costs or the second set of costs in examples when more than one cost is determined for the first planned trajectory 110 and the second planned trajectory 112. For example, the analysis component 210 can add the bias value to the first cost to increase the first cost as an adjusted first cost which can be subsequently compared to the second cost to determine the output data 108.

In some examples, a relatively higher bias value (e.g., 50 versus 2) can increase the probability of the analysis component 210 determining (or selecting) a particular planned trajectory. For example, in a scenario such as the vehicle 102 picking up or dropping off a passenger, the bias component 208 can determine a bias value that is sufficiently large to cause the trajectory determination component 104 to output the second planned trajectory 112 which enables the vehicle 102 to utilize a human-driving trained model to navigate within a threshold distance of the passenger (e.g., a destination) to safely perform the pick-up/drop-off scenario. For instance, position data associated with the passenger can be used as input data for the bias component 208 to determine the bias value, or otherwise determine presence of a pick-up/drop-off region defined by a threshold distance from the passenger's location in the environment.

The bias value may change over time to cause the vehicle 102 to use a planned trajectory that causes a desired vehicle behavior. For example, the bias component 208 can adjust the bias value as the vehicle operates in an environment to improve decisions by the vehicle 102 including but not limited to determining whether to change lanes, merging due to lane ending, determine a velocity relative to a speed limit, and/or determine when and where to safely stop. For example, one of the first model 114 or the second model 116 may perform better at performing a lane change, and the bias value can change when the vehicle remains stationary for a threshold time to cause an alternate planned trajectory to be selected for changing from a first lane to a second lane. The bias value may also or instead change to improve how the vehicle stops relative to a road marker and/or determines a velocity relative to a speed limit. In various examples, the safety cost (or other cost) associated with each planned trajectory from the models 206 can be weighted higher than another cost to ensure than a lane change using a planned trajectory is performed safely.

In some examples, the analysis component 210 can determine the bias value based on sensor data, map data, or other input data indicating a traffic light changing from one of: green to yellow, yellow to red, or the like, so that the vehicle can respond to the traffic light using a planned trajectory from one of the available model(s) 206. In such examples, the bias value can cause the trajectory determination component 104 to use a planned trajectory from a model that, over time, performs better during simulation and/or real-world scenarios in scenario involving a traffic light, or the like.

In some examples, the analysis component 210 can determine the bias value based on a velocity of the vehicle 102 and/or a velocity of an object proximate the vehicle 102. For instance, the bias value can cause the vehicle 102 to use an output from the first model 114 under a threshold velocity, and to use the second model 116 over the threshold velocity. In this way, the vehicle can leverage using a planned trajectory from a model that is trained for operating within a specific velocity range, such as using a planned trajectory from a model that is based on a set of costs when the vehicle 102 operates on a highway. The threshold velocity can correspond to a speed limit, or represent a velocity (e.g., 45 miles per hour) above and below which different models output better predictions over time including a model that may adapt to local driving practices that may differ from posted traffic rules.

In some examples, the analysis component 210 can determine the bias value based on a position of the vehicle 102 relative to a surface of an environment. For instance, the bias value can cause the vehicle 102 to stay in an approximate center of a lane rather than drifting to one side of the lane by relying on an output from one of the model(s) 206 that is trained for operating in regions having lane markers to designate a lane or other indicators of a drivable surface. In some examples, the trajectory determination component 104 can receive a planned trajectory that is based on human driving data for determining a position of the vehicle 102 relative to lane markers or boundaries.

Additionally, or alternatively, the analysis component 210 can determine the bias value for operation on dirt roads or other surfaces that lack signs, lane markers, or the like. For example, the vehicle 102 may not detect a driving surface due to inclement weather and the bias value can determined to cause a preference towards the trajectory determination component 104 determining the second planned trajectory 112 from the second model 116 to use a planned trajectory trained using human driving data in similar scenarios (e.g., end of asphalt or concrete, no lane markers, or lane markers are obscured from being sensed, etc.).

In some examples, the analysis component 210 can determine that the bias value from the bias component 208 meets or exceeds a bias threshold (e.g., the bias value is sufficiently large to effectively cause selection) and output an indication to use one of the planned trajectories. For example, the analysis component 210 can override a bias value (e.g., make a determine independent of the bias value) based on the vehicle 102 being within a threshold distance of a region (e.g., pick-up/drop-off region, a construction zone, school zone, a parking lot, etc.), detecting a threshold number of objects (e.g., a group of pedestrians, etc.), and/or detecting an object type (e.g., presence of a child, a person with a mobility impairment, an animal off leash, or the like).

In some examples, the analysis component 210 can determine that the region corresponds to a junction type one of the planned trajectories improves braking and/or stopping at a junction such as determining whether to perform a rolling stop, a complete stop, and/or determining a braking rate, etc.). The junction type and include various types of road junctions (e.g., t-intersections, round intersections, ramps, etc.). In some examples, the analysis component 210 can determine that the roadway includes a stop line or other marking, and determine to use a planned trajectory that will stop completely prior to and relative to the stop line (e.g., as opposed to performing a rolling top or stopping on or beyond the stop line).

In various examples, the bias component 208 and/or the analysis component 210 can represent, or otherwise be associated with, a machine learned model. For example, the bias component 208 can include a first machine learned model and the analysis component 210 can include a second machine learned model. However, in some examples the functionality associated with the bias component 208 and the analysis component 210 may be included in a single machine learned model (which may also be configured to perform other functionality or techniques described herein).

Data output by the computing device(s) 202 can be used in a variety of ways. For example, the output data 108 indicating a planned trajectory can be used to perform a simulation, control a vehicle, and/or validate or test vehicle performance, just to name a few. For example, the output 108 310 can be used for validating, based at least in part on a result of the simulation, an output by a component configured to control the vehicle in the environment at a future time. For instance, the result of the simulation can be used to validate a determination or prediction from a planning component, prediction component, and the like.

In some examples, at least a portion of the output data 108 can be stored in a storage device for access at a later time. For example, information about bias values and associated with actions may be stored in a database for use as input data and/or training data.

In some examples, the computing device(s) 202 can transmit at least a portion of the output data 108 to a computing device or component configured to control an autonomous vehicle. For example, a trajectory determined by the trajectory determination component 104 can be transmitted to a planning component of a vehicle computing device that is configured to determine planning data (e.g., another vehicle trajectory, an object trajectory, an output by a decision tree, etc.) and/or to a vehicle safety system.

In some examples, the output data 108 can be used to validate or test performance of a vehicle. For example, a safety system, such as a collision avoidance system, can receive the planned trajectory for processing. Additionally or alternatively, performance of a vehicle controller configured to control some aspect of the vehicle (e.g., a braking system, an acceleration system, and the like) can be validated by enabling the vehicle controller to receive the output data 108 as input.

In various examples, the planned trajectory associated with the output data 108 can be configured for use in a decision tree to control the vehicle 102. For instance, one or more planned trajectories can be associated with a respective reference action, or node of the decision tree.

Figure 3:
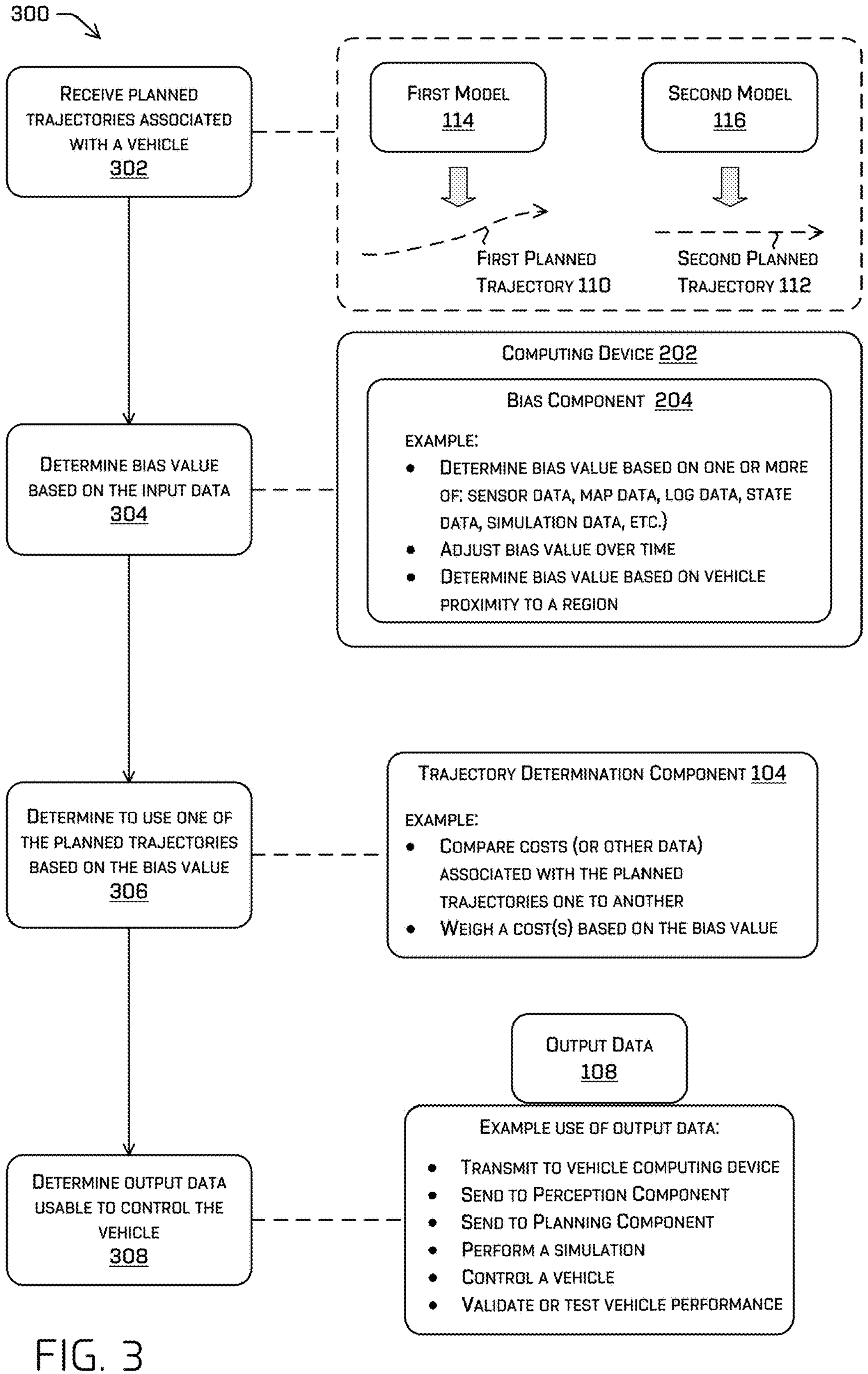
FIG. 3 is a pictorial flow diagram of an example process for implementing techniques to determine a planned trajectory to control a vehicle.

FIG. 3 is a pictorial flow diagram of an example process 300 for implementing techniques to determine a planned trajectory to control a vehicle. For example, the vehicle 102 can implement a model (e.g., the trajectory determination component 104) and/or a planning component (the planning component 118) to predict a vehicle trajectory. The example process 300 may be implemented by a computing device such as the computing device(s) 202 of FIG. 2, the vehicle computing device(s) 404 of FIG. 4, and/or the computing device(s) 436 of FIG. 4.

An operation 302 can include receiving planned trajectories associated with a vehicle. For example, the computing device 202 can receive the first planned trajectory 110 from the first model 114 and the second planned trajectory 112 from the second model 116. The first model 114 and the second model 116 may be trained using different training data so that the first planned trajectory 110 has a different braking action, acceleration action, and/or steering action than the second planned trajectory 112. In some examples, the computing device 202 can receive the planned trajectories from two or more models (e.g., the model(s) 206 of FIG. 2) in which the two or more models are configured to output a planned trajectory based on at least some different criteria. For example, the second model 116 can determine the second planned trajectory based on sensor data, map data, or the like, but using different training data than the first model 114.

An operation 304 can include determining a bias value based on the input data. For instance, the bias component 208 can determine a bias value for associating with one of the planned trajectories received as part of the input data 106 (e.g., one or more of: sensor data, map data, log data, state data associated with a vehicle and/or an object, simulation data, etc.). The bias component 208 may determine the bias value based on presence of a region (e.g., a position of the vehicle relative to a region), an object, object type, or the like. In various examples, the bias value can change over time as the vehicle 102 operates in an environment.

An operation 306 can include determining to use one of the planned trajectories based on the bias value. The trajectory determination component 104 can, for example, receive one or more costs, difference values, classifications, or other output indicating results of a first simulation using the first planned trajectory 110 and a second simulation using the second planned trajectory 112 for comparison or otherwise determining the output data 108. In some examples, the trajectory determination component 104 can receive a set of costs for each of the planned trajectories, and compare one or more costs on the respective sets of costs to identify the planned trajectory associated with a lowest cost, or lowest set of costs.

In various examples, the trajectory determination component 104 can receive the bias value from the bias component 208 and weigh one or more costs associated with a planned trajectory. The "weight" can represent a value mathematically applied to a cost (e.g., a safety cost), as a biased cost, to increase or decrease the cost for the planned trajectory, and the trajectory determination component 104 can determine one of the planned trajectories from a set of available planned trajectories based on a comparison between a cost and a biased cost.

An operation 308 can include determining output data usable to control the vehicle. For example, the computing device 202 can generate the output data 108 including the determined planned trajectory. In some examples, the output data 108 can be transmitting to a vehicle computing device (associated with the vehicle 102 or another vehicle in a fleet of vehicles), a vehicle safety system, or sent to the simulation component 204 to initiate a simulation between the vehicle 102 and one or more objects. The output data 108 can also or instead be used to test or validate performance of a vehicle controller, model, or component.

By implementing the techniques described herein, safety of the autonomous vehicle can be improved by determining a planned trajectory for use in a real-world environment. In some examples, the techniques enable vehicle performance determinations such as how a vehicle responds to an object(s) in a simulated scenario and/or a real-world environment.

While described as a separate system, in some examples, techniques to determine a planned trajectory described herein in relation to FIGS. 1-3 may be implemented by other vehicle systems, components, and/or computing devices. For example, and as will be described in further detail with regard to FIG. 4, the prediction techniques described herein in relation to FIGS. 1-3 may be implemented at least partially by or in association with a perception component, a planning component, and/or a model component of FIG. 4.

Figure 4:
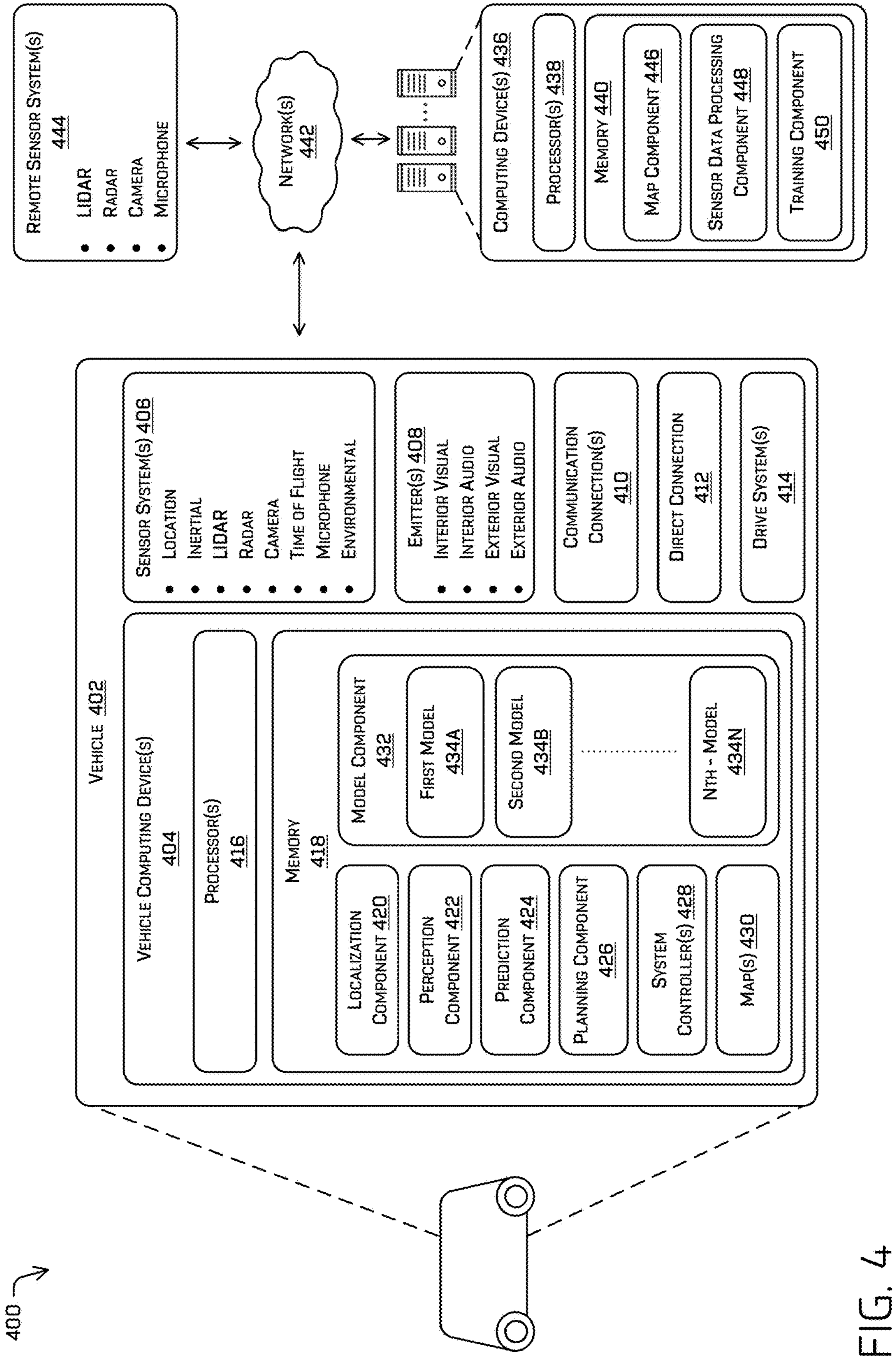
FIG. 4 is a block diagram of an example system for implementing the techniques described herein.

FIG. 4 is a block diagram of an example system 400 for implementing the techniques described herein. In at least one example, the system 400 may include a vehicle, such as vehicle 402.

The vehicle 402 may include one or more vehicle computing device(s) 404, one or more sensor systems 406, one or more emitters 408, one or more communication connections 410, at least one direct connection 412, and one or more drive system(s) 414.

The vehicle computing device(s) 404 may include one or more processors 416 and memory 418 communicatively coupled with the one or more processors 416. In the illustrated example, the vehicle 402 is an autonomous vehicle; however, the vehicle 402 could be any other type of vehicle, such as a semi-autonomous vehicle, or any other system having at least an image capture device (e.g., a camera enabled smartphone). In some instances, the autonomous vehicle 402 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 402 may be a fully or partially autonomous vehicle having any other level or classification.

In various examples, the vehicle computing device(s) 404 may store sensor data associated with actual location of an object at the end of the set of estimated states (e.g., end of the period of time) and may use this data as training data to train one or more models. In some examples, the vehicle computing device(s) 404 may provide the data to a remote computing device (i.e., computing device separate from vehicle computing device such as the computing device(s) 436) for data analysis. In such examples, the remote computing device(s) may analyze the sensor data to determine an actual location, velocity, direction of travel, or the like of the object at the end of the set of estimated states.

In the illustrated example, the memory 418 of the vehicle computing device(s) 404 stores a localization component 420, a perception component 422, a prediction component 424, a planning component 426, one or more system controllers 428, one or more maps 430, and a model component 432 including one or more model(s), such as a first model 434A, a second model 434B, up to an Nth model 434N (collectively "models 434"), where N is an integer. Though depicted in FIG. 4 as residing in the memory 418 for illustrative purposes, it is contemplated that the localization component 420, the perception component 422, the prediction component 424, the planning component 426, one or more system controllers 428, one or more maps 430, and/or the model component 432 including the model(s) 434 may additionally, or alternatively, be accessible to the vehicle 402 (e.g., stored on, or otherwise accessible by, memory remote from the vehicle 402, such as, for example, on memory 440 of a remote computing device 436).

In at least one example, the localization component 420 may include functionality to receive data from the sensor system(s) 406 to determine a position and/or orientation of the vehicle 402 (e.g., one or more of an x-, y-, z-position, roll, pitch, or yaw). For example, the localization component 420 may include and/or request/receive a map of an environment, such as from map(s) 430 and/or map component 446, and may continuously determine a location and/or orientation of the autonomous vehicle within the map. In some instances, the localization component 420 may utilize SLAM (simultaneous localization and mapping), CLAMS (calibration, localization and mapping, simultaneously), relative SLAM, bundle adjustment, non-linear least squares optimization, or the like to receive image data, lidar data, radar data, IMU data, GPS data, wheel encoder data, and the like to accurately determine a location of the autonomous vehicle. In some instances, the localization component 420 may provide data to various components of the vehicle 402 to determine an initial position of an autonomous vehicle for determining the relevance of an object to the vehicle 402, as discussed herein.

In some instances, the perception component 422 may include functionality to perform object detection, segmentation, and/or classification. In some examples, the perception component 422 may provide processed sensor data that indicates a presence of an object (e.g., entity) that is proximate to the vehicle 402 and/or a classification of the object as an object type (e.g., car, pedestrian, cyclist, animal, building, tree, road surface, curb, sidewalk, unknown, etc.). In some examples, the perception component 422 may provide processed sensor data that indicates a presence of a stationary entity that is proximate to the vehicle 402 and/or a classification of the stationary entity as a type (e.g., building, tree, road surface, curb, sidewalk, unknown, etc.). In additional or alternative examples, the perception component 422 may provide processed sensor data that indicates one or more features associated with a detected object (e.g., a tracked object) and/or the environment in which the object is positioned. In some examples, features associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Features associated with the environment may include, but are not limited to, a presence of another object in the environment, a state of another object in the environment, a time of day, a day of a week, a season, a weather condition, an indication of darkness/light, etc.

The prediction component 424 can generate one or more probability maps representing prediction probabilities of possible locations of one or more objects in an environment. For example, the prediction component 424 can generate one or more probability maps for vehicles, pedestrians, animals, and the like within a threshold distance from the vehicle 402. In some instances, the prediction component 424 can measure a track of an object and generate a discretized prediction probability map, a heat map, a probability distribution, a discretized probability distribution, and/or a trajectory for the object based on observed and predicted behavior. In some instances, the one or more probability maps can represent an intent of the one or more objects in the environment.

In some examples, the prediction component 424 may generate predicted trajectories of objects (e.g., objects) in an environment and/or to generate predicted candidate trajectories for the vehicle 402. For example, the prediction component 424 may generate one or more predicted trajectories for objects within a threshold distance from the vehicle 402. In some examples, the prediction component 424 may measure a trace of an object and generate a trajectory for the object based on observed and predicted behavior.

In general, the planning component 426 may determine a path for the vehicle 402 to follow to traverse through an environment. For example, the planning component 426 may determine various routes and trajectories and various levels of detail. For example, the planning component 426 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planning component 426 may generate an instruction for guiding the autonomous vehicle along at least a portion of the route from the first location to the second location. In at least one example, the planning component 426 may determine how to guide the autonomous vehicle from a first waypoint in the sequence of waypoints to a second waypoint in the sequence of waypoints. In some examples, the instruction may be a candidate trajectory, or a portion of a trajectory. In some examples, multiple trajectories may be substantially simultaneously generated (e.g., within technical tolerances) in accordance with a receding horizon technique. A single path of the multiple paths in a receding data horizon having the highest confidence level may be selected to operate the vehicle. In various examples, the planning component 426 can select a trajectory for the vehicle 402 based at least in part on receiving data representing an output of the model component 432.

In other examples, the planning component 426 can alternatively, or additionally, use data from the localization component 420, the perception component 422, and/or the prediction component 424 to determine a path for the vehicle 402 to follow to traverse through an environment. For example, the planning component 426 can receive data from the localization component 420, the perception component 422, and/or the prediction component 424 regarding objects associated with an environment. Using this data, the planning component 426 can determine a route to travel from a first location (e.g., a current location) to a second location (e.g., a target location) to avoid objects in an environment. In at least some examples, such a planning component 426 may determine there is no such collision free path and, in turn, provide a path which brings vehicle 402 to a safe stop avoiding all collisions and/or otherwise mitigating damage. Additionally or alternatively, the planning component 426 can determine the path for the vehicle 402 to follow based at least in part on data received from a simulation component and/or the trajectory determination component 104 as described in FIGS. 1-3 and elsewhere.

In at least one example, the vehicle computing device(s) 404 may include one or more system controllers 428, which may be configured to control steering, propulsion, braking, safety, emitters, communication, and other systems of the vehicle 402. The system controller(s) 428 may communicate with and/or control corresponding systems of the drive system(s) 414 and/or other components of the vehicle 402.

The memory 418 may further include one or more maps 430 that may be used by the vehicle 402 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In examples, a map may include a three-dimensional mesh of the environment. In some examples, the vehicle 402 may be controlled based at least in part on the map(s) 430. That is, the map(s) 430 may be used in connection with the localization component 420, the perception component 422, the prediction component 424, and/or the planning component 426 to determine a location of the vehicle 402, detect objects in an environment, generate routes, determine actions and/or trajectories to navigate within an environment.

In some examples, the one or more maps 430 may be stored on a remote computing device(s) (such as the computing device(s) 436) accessible via network(s) 442. In some examples, multiple maps 430 may be stored based on, for example, a characteristic (e.g., type of entity, time of day, day of week, season of the year, etc.). Storing multiple maps 430 may have similar memory requirements, but increase the speed at which data in a map may be accessed.

As illustrated in FIG. 4, the vehicle computing device(s) 404 may include a model component 432. The model component 432 may be configured to perform the functionality of the trajectory determination component 104, including predicting a planned trajectory based on a bias value. In various examples, the model component 432 may receive one or more features associated with the detected object(s) from the perception component 422 and/or from the sensor system(s) 406. In some examples, the model component 432 may receive environment characteristics (e.g., environmental factors, etc.) and/or weather characteristics (e.g., weather factors such as snow, rain, ice, etc.) from the perception component 422 and/or the sensor system(s) 406. While shown separately in FIG. 4, the model component 432 could be part of the prediction component 424, the planning component 426, or other component(s) of the vehicle 402.

In various examples, the model component 432 may send predictions from the one or more models 434 that may be used by the prediction component 424 and/or the planning component 426 to generate one or more predicted trajectories of the object (e.g., direction of travel, speed, etc.) and/or one or more predicted trajectories of the object (e.g., direction of travel, speed, etc.), such as from the prediction component thereof. In some examples, the planning component 426 may determine one or more actions (e.g., reference actions and/or sub-actions) for the vehicle 402, such as vehicle candidate trajectories. In some examples, the model component 432 may be configured to determine audio data for emitting into a portion of an environment based at least in part on the one or more actions for the vehicle 402. In some examples, the model component 432 may be configured to determine audio characteristics that are applicable to the environment, such as based on environment characteristics, weather characteristics, or the like.

In various examples, the model component 432 may utilize machine learned techniques to predict audio associated with an object or region. In such examples, the machine learned algorithms may be trained to determine, based on sensor data and/or previous predictions by the model, that an object is likely to behave in a particular way relative to the vehicle 402 at a particular time during a set of estimated states (e.g., time period). In such examples, one or more of the vehicle 402 state (position, velocity, acceleration, trajectory, etc.) and/or the object state, classification, etc. may be input into such a machine learned model and, in turn, a behavior prediction may be output by the model.

In various examples, characteristics associated with each object type may be used by the model component 432 to determine frequency information, sound intensity, and other characteristics for one or more objects. Examples of characteristics of an object type may include, but not be limited to: a maximum longitudinal acceleration, a maximum lateral acceleration, a maximum vertical acceleration, a maximum speed, maximum change in direction for a given speed, and the like.

As can be understood, the components discussed herein (e.g., the localization component 420, the perception component 422, the prediction component 424, the planning component 426, the one or more system controllers 428, the one or more maps 430, the model component 432 including the model(s) 434 are described as divided for illustrative purposes. However, the operations performed by the various components may be combined or performed in any other component.

While examples are given in which the techniques described herein are implemented by a planning component and/or a model component of the vehicle, in some examples, some or all of the techniques described herein could be implemented by another system of the vehicle, such as a secondary safety system. Generally, such an architecture can include a first computing device to control the vehicle 402 and a secondary safety system that operates on the vehicle 402 to validate operation of the primary system and to control the vehicle 402 to avoid collisions.

In some instances, aspects of some or all of the components discussed herein may include any models, techniques, and/or machine learned techniques. For example, in some instances, the components in the memory 418 (and the memory 440, discussed below) may be implemented as a neural network.

As described herein, an exemplary neural network is a technique which passes input data through a series of connected layers to produce an output. Each layer in a neural network may also comprise another neural network, or may comprise any number of layers (whether convolutional or not). As can be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional or alternate examples of architectures may include neural networks such as ResNet-50, ResNet-101, VGG, DenseNet, PointNet, Xception, ConvNeXt, and the like; visual transformer(s) (ViT(s)), such as a bidirectional encoder from image transformers (BEIT), visual bidirectional encoder from transformers (VisualBERT), image generative pre-trained transformer (Image GPT), data-efficient image transformers (DeiT), deeper vision transformer (DeepViT), convolutional vision transformer (CvT), detection transformer (DETR), Miti-DETR, or the like; and/or general or natural language processing transformers, such as BERT, ROBERTa, XLNet, GPT-2, GPT-3, or the like.

In at least one example, the sensor system(s) 406 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 406 may include multiple instances of each of these or other types of sensors. For instance, the lidar sensors may include individual lidar sensors located at the corners, front, back, sides, and/or top of the vehicle 402. As another example, the camera sensors may include multiple cameras disposed at various locations about the exterior and/or interior of the vehicle 402. The sensor system(s) 406 may provide input to the vehicle computing device(s) 404. Additionally, or in the alternative, the sensor system(s) 406 may send sensor data, via the one or more networks 442, to the one or more computing device(s) 436 at a particular frequency, after a lapse of a predetermined period of time, in near real-time, etc.

The vehicle 402 may also include one or more emitters 408 for emitting light and/or sound. The emitter(s) 408 may include interior audio and visual emitters to communicate with passengers of the vehicle 402. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 408 may also include exterior emitters. By way of example and not limitation, the exterior emitters may include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 402 may also include one or more communication connections 410 that enable communication between the vehicle 402 and one or more other local or remote computing device(s). For instance, the communication connection(s) 410 may facilitate communication with other local computing device(s) on the vehicle 402 and/or the drive system(s) 414. Also, the communication connection(s) 410 may allow the vehicle to communicate with other nearby computing device(s) (e.g., remote computing device 436, other nearby vehicles, etc.) and/or one or more remote sensor system(s) 444 for receiving sensor data. The communications connection(s) 410 also enable the vehicle 402 to communicate with a remote teleoperations computing device or other remote services.

The communications connection(s) 410 may include physical and/or logical interfaces for connecting the vehicle computing device(s) 404 to another computing device or a network, such as network(s) 442. For example, the communications connection(s) 410 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 402 may include one or more drive systems 414. In some examples, the vehicle 402 may have a single drive system 414. In at least one example, if the vehicle 402 has multiple drive systems 414, individual drive systems 414 may be positioned on opposite ends of the vehicle 402 (e.g., the front and the rear, etc.). In at least one example, the drive system(s) 414 may include one or more sensor systems to detect conditions of the drive system(s) 414 and/or the surroundings of the vehicle 402. By way of example and not limitation, the sensor system(s) may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, lidar sensors, radar sensors, etc. Some sensors, such as the wheel encoders may be unique to the drive system(s) 414. In some cases, the sensor system(s) on the drive system(s) 414 may overlap or supplement corresponding systems of the vehicle 402 (e.g., sensor system(s) 406).

The drive system(s) 414 may include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 414 may include a drive module controller which may receive and preprocess data from the sensor system(s) and to control operation of the various vehicle systems. In some examples, the drive module controller may include one or more processors and memory communicatively coupled with the one or more processors. The memory may store one or more modules to perform various functionalities of the drive system(s) 414. Furthermore, the drive system(s) 414 may also include one or more communication connection(s) that enable communication by the respective drive module with one or more other local or remote computing device(s).

In at least one example, the direct connection 412 may provide a physical interface to couple the one or more drive system(s) 414 with the body of the vehicle 402. For example, the direct connection 412 may allow the transfer of energy, fluids, air, data, etc. between the drive system(s) 414 and the vehicle. In some instances, the direct connection 412 may further releasably secure the drive system(s) 414 to the body of the vehicle 402.

In at least one example, the localization component 420, the perception component 422, the prediction component 424, the planning component 426, the one or more system controllers 428, the one or more maps 430, and the model component 432, may process sensor data, as described above, and may send their respective outputs, over the one or more network(s) 442, to the computing device(s) 436. In at least one example, the localization component 420, the perception component 422, the prediction component 424, the planning component 426, the one or more system controllers 428, the one or more maps 430, and the model component 432 may send their respective outputs to the remote computing device(s) 436 at a particular frequency, after a lapse of a predetermined period of time, in near real-time, etc.

In some examples, the vehicle 402 may send sensor data to the computing device(s) 436 via the network(s) 442. In some examples, the vehicle 402 may receive sensor data from the computing device(s) 436 and/or remote sensor system(s) 444 via the network(s) 442. The sensor data may include raw sensor data and/or processed sensor data and/or representations of sensor data. In some examples, the sensor data (raw or processed) may be sent and/or received as one or more log files.

The computing device(s) 436 may include processor(s) 438 and a memory 440 storing the map component 446, a sensor data processing component 448, and a training component 450. In some examples, the map component 446 may include functionality to generate maps of various resolutions. In such examples, the map component 446 may send one or more maps to the vehicle computing device(s) 404 for navigational purposes. In various examples, the sensor data processing component 448 may be configured to receive data from one or more remote sensors, such as sensor system(s) 406 and/or remote sensor system(s) 444. In some examples, the sensor data processing component 448 may be configured to process the data and send processed sensor data to the vehicle computing device(s) 404, such as for use by the model component 432 (e.g., the model(s) 434). In some examples, the sensor data processing component 448 may be configured to send raw sensor data to the vehicle computing device(s) 404.

In some instances, the training component 450 can include functionality to train a machine learning model to output evaluate trajectories. For example, the training component 450 can receive sensor data that represents an object traversing through an environment for a period of time, such as 0.1 milliseconds, 1 second, 3, seconds, 5 seconds, 7 seconds, and the like. At least a portion of the sensor data can be used as an input to train the machine learning model.

In some instances, the training component 450 may be executed by the processor(s) 438 to train a machine learning model based on training data. The training data may include a wide variety of data, such as sensor data, audio data, image data, map data, inertia data, vehicle state data, historical data (log data), or a combination thereof, that is associated with a value (e.g., a desired classification, inference, prediction, etc.). Such values may generally be referred to as a "ground truth." To illustrate, the training data may be used for determining risk associated with evaluated trajectories and, as such, may include data representing an environment that is captured by an autonomous vehicle and that is associated with one or more classifications or determinations. In some examples, such a classification may be based on user input (e.g., user input indicating that the data depicts a specific risk) or may be based on the output of another machine learned model. In some examples, such labeled classifications (or more generally, the labeled output associated with training data) may be referred to as ground truth.

In some instances, the training component 450 can include functionality to train a machine learning model to output classification values. For example, the training component 450 can receive data that represents labelled collision data (e.g., publicly available data, sensor data, and/or a combination thereof). At least a portion of the data can be used as an input to train the machine learning model. Thus, by providing data where the vehicle traverses an environment, the training component 450 can be trained to output potential intersection(s) associated with objects, as discussed herein.

In some examples, the training component 450 can include training data that has been generated by a simulator. For example, simulated training data can represent examples where a vehicle collides with an object in an environment or nearly collides with an object in an environment, to provide additional training examples.

The processor(s) 416 of the vehicle 402 and the processor(s) 438 of the computing device(s) 436 may be any suitable processor capable of executing instructions to process data and perform operations as described herein. By way of example and not limitation, the processor(s) 416 and 438 may comprise one or more Central Processing Units (CPUs), Graphics Processing Units (GPUs), Tensor Processing Units (TPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 418 and memory 440 are examples of non-transitory computer-readable media. The memory 418 and memory 440 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

It should be noted that while FIG. 4 is illustrated as a distributed system, in alternative examples, components of the vehicle 402 may be associated with the computing device(s) 436 and/or components of the computing device(s) 436 may be associated with the vehicle 402. That is, the vehicle 402 may perform one or more of the functions associated with the computing device(s) 436, and vice versa.

Figure 5:
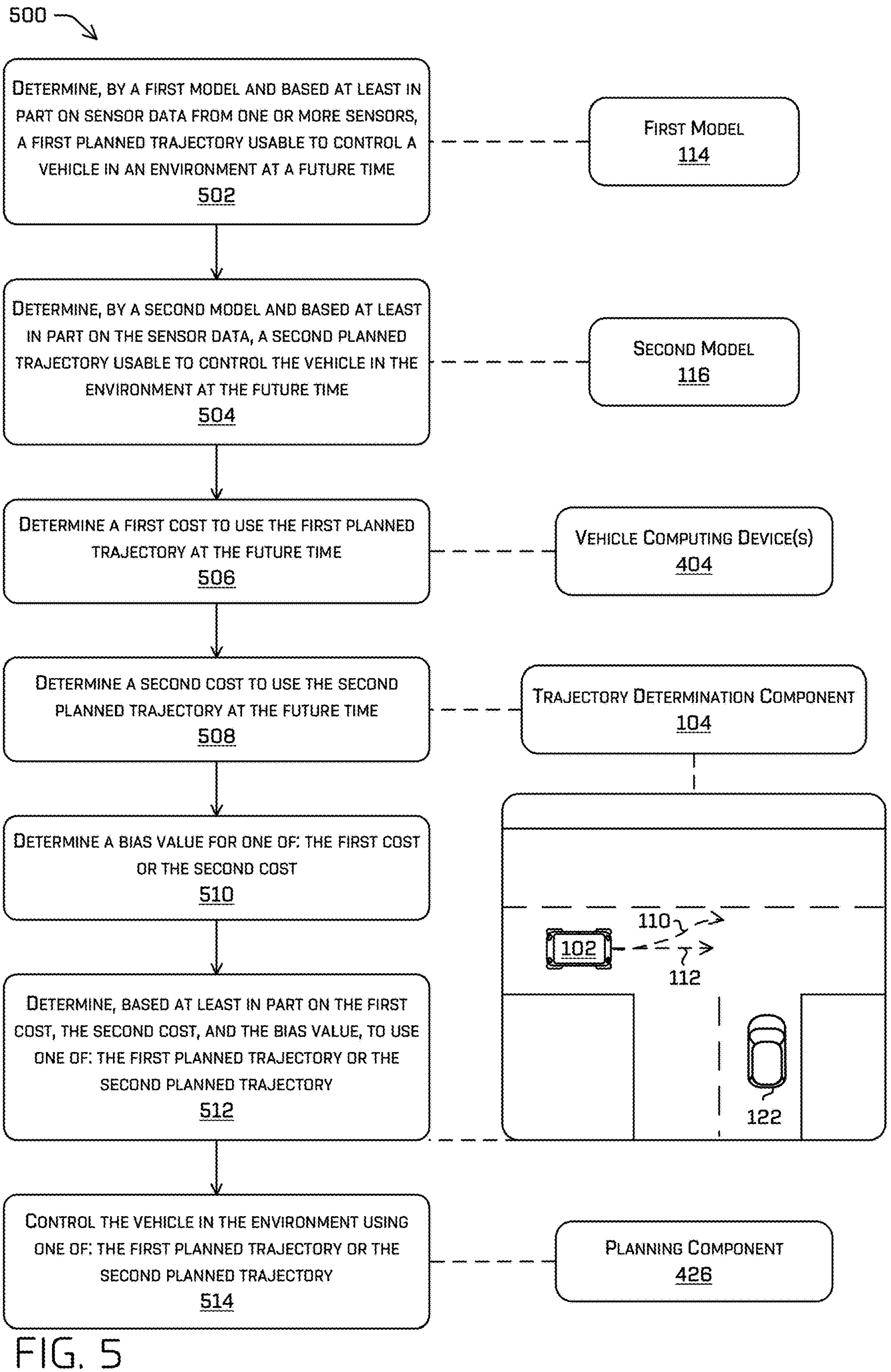
FIG. 5 is a flowchart depicting an example process for determining a vehicle trajectory using one or more example components.

FIG. 5 is a flowchart depicting an example process 500 for determining a vehicle trajectory using one or more example components. For example, some or all of the process 500 can be performed by one or more components in FIGS. 1-4, as described herein. For example, some or all of the process 500 can be performed by the vehicle computing device(s) 404, the computing device(s) 436, or the computing device 202. However, the process 500 is not limited to being performed by these components, and the components are not limited to performing the process 500.

At operation 502, the process 500 can include determining, by a first model and based at least in part on sensor data from one or more sensors, a first planned trajectory usable to control a vehicle in an environment at a future time. In some examples, the operation 502 may include the vehicle computing device 404 (e.g., the computing device 202) implementing the first model 114 (e.g., as the first model 434A) to receive sensor data from a lidar sensor, a radar sensor, an image sensor, and so on, associated with the vehicle 102. In some examples, the sensor data represents objects detected the environment, such as the object 120 and the object 122. The sensor data may be received from one or more sensors on the vehicle and/or from one or more remote sensors (e.g., a sensor in the environment and/or a sensor on another vehicle). In some examples, the first model 114 may also receive other data as input, such as map data or other data described in association with the input data 106. In various examples, the first model 114 can be trained to determine the first planned trajectory 110 based at least in part on a set of costs including an intersection cost, a following cost, a lane change cost, a signal cost, and/or a braking cost, just to name a few.

At operation 504, the process may include determining, by a second model and based at least in part on the sensor data, a second planned trajectory usable to control the vehicle in the environment at the future time. In some examples, the operation 504 may include the vehicle computing device implementing the second model 116 to receive the sensor data and determine the second planned trajectory 112. In some examples, the second model 116 can be trained to determine the second planned trajectory 112 based at least in part on driving data associated with a human driver. The second model 116 may, in various examples, be trained independent of one or more costs in the set of costs used as training data to train the first model 114.

At operation 506, the process may include determining a first cost to use the first planned trajectory at the future time. The operation 506 may include, for example, the vehicle computing device 404 implementing the simulation component 204 and/or the analysis component 210 to determine an intersection cost, a safety cost, a progress cost, a comfort cost, or the like resultant from performing a simulation that includes the first planned trajectory 110 and the second planned trajectory 112. In some examples, the operation 506 may include the analysis component 210 determining a first intersection cost between the vehicle and an object using the first planned trajectory 110 during a simulation performed by the simulation component 204.

At operation 508, the process may include determining a second cost to use the second planned trajectory at the future time. In some examples, the operation 508 may include the vehicle computing device 404 implementing the simulation component 204 and/or the analysis component 210 to determine an intersection cost, a safety cost, a progress cost, a comfort cost, or the like resultant from performing the simulation. In some examples, the operation 506 may include the analysis component 210 determining a second intersection cost between the vehicle and the object during a simulation performed by the simulation component 204.

At operation 510, the process may include determining a bias value for one of: the first cost or the second cost. In some examples, the operation 510 may include the vehicle computing device 404 implementing the bias component 208 to output a bias value for one of the first planned trajectory 110 or the second planned trajectory 112. The bias value may, for example, be based on the vehicle 404 being proximate a region such as a construction zone, or the like.

At operation 512, the process may include determining, based at least in part on the first cost, the second cost, and the bias value, to use one of: the first planned trajectory or the second planned trajectory. In some examples, the operation 512 may include the vehicle computing device 404 implementing the trajectory determination component 104 to determine to use one of the first planned trajectory 110 or the second planned trajectory 112. For example, the trajectory determination component 104 can compare the first intersection cost, the second intersection cost, and apply the bias value before or after the comparison. For example, the bias value may be associated with the first planned trajectory 110 to increase the first intersection cost, causing the trajectory determination component 104 to identify the second planned trajectory 112 as being optimal for the upcoming construction zone.

At operation 514, the process may include controlling the vehicle in the environment using one of: the first planned trajectory or the second planned trajectory. In some examples, the operation 514 may include the controlling the vehicle 402 based on the planned trajectory determined by the trajectory determination component 104. In some examples, the operation 512 may include controlling a braking system, an acceleration system, a steering system, s drive system, etc. of the vehicle 402 according to (e.g., follow) the planned trajectory determined by the trajectory determination component 104.

FIGS. 3 and 5 illustrate example processes 300 and 500 in accordance with examples of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be omitted and/or combined in any order and/or in parallel to implement the processes.

The methods described herein represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. In some embodiments, one or more operations of the method may be omitted entirely. By way of example and not limitation, operation 512 may be performed without operation 514. Moreover, the methods described herein can be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

EXAMPLE CLAUSES

Any of the example clauses in this section may be used with any other of the example clauses and/or any of the other examples or embodiments described herein.

A: A system comprising: one or more processors; and one or more non-transitory computer-readable media storing instructions executable by the one or more processors, wherein the instructions, when executed, cause the system to perform operations comprising: receiving sensor data from a sensor associated with an autonomous vehicle; determining, by a first model and based at least in part on the sensor data and a set of costs, a first planned trajectory usable to control the autonomous vehicle in an environment at a future time; determining, by a second model and based at least in part on the sensor data, a second planned trajectory usable to control the autonomous vehicle in the environment at the future time, the second model trained to determine the second planned trajectory independent of the set of costs; determining a first cost to use the first planned trajectory at the future time; determining a second cost to use the second planned trajectory at the future time; determining a bias value associated with a preference for following the first planned trajectory or the second planned trajectory; determining, as a control trajectory and based at least in part on the first cost, the second cost, and the bias value, one of the first planned trajectory or the second planned trajectory; and controlling the autonomous vehicle in the environment based at least in part on the control trajectory.

B: The system of paragraph A, wherein: the bias value represents a weight associated with one of: the first cost or the second cost to indicate a preference for the first planned trajectory or the second planned trajectory, and determining to use one of: the first planned trajectory or the second planned trajectory based at least in part on comparing the first cost, the second cost, and the weight.

C: The system of paragraph A or B, the operations further comprising: receiving one of: map data associated with the environment or log data associated with the autonomous vehicle; and determining the bias value based at least in part on the map data or the log data.

D: The system of any of paragraphs A-C, the operations further comprising: determining that the first cost and the second cost are a same value; identifying, based at least in part on the first cost and the second cost being the same value, a third cost associated with the first planned trajectory and a fourth cost associated with the second planned trajectory; and comparing the third cost associated with the first planned trajectory to the fourth cost associated with the second planned trajectory; wherein determining, as the control trajectory, the first planned trajectory or the second planned trajectory is based at least in part on comparing the third cost and the fourth cost.

E: The system of any of paragraphs A-D, wherein: the second model is a machine learned model that determines the second planned trajectory based at least in part on driving data associated with a human driver, and the first cost or the second cost comprises one of: an intersection cost indicating a likelihood for an object in the environment to intersect with the autonomous vehicle, a safety cost indicating a level of safety associated with a corresponding trajectory, a progress cost indicating an amount of progress by the autonomous vehicle using the corresponding trajectory, or a comfort cost indicating a comfort level for a passenger of the autonomous vehicle.

F: The system of any of paragraphs A-E, wherein: the bias value is determined based at least in part on one or more of: vehicle state data of the autonomous vehicle, a number of objects within a threshold distance of the autonomous vehicle, presence of a construction zone, or a distance between the autonomous vehicle and a destination in the environment.

G: One or more non-transitory computer-readable media storing instructions executable by one or more processors, wherein the instructions, when executed, cause the one or more processors to perform operations comprising: determining, by a first model and based at least in part on sensor data from one or more sensors, a first planned trajectory usable to control a vehicle in an environment at a future time; determining, by a second model and based at least in part on the sensor data, a second planned trajectory usable to control the vehicle in the environment at the future time, the second model different from the first model; determining a bias value indicative of a preference for controlling a vehicle according to the first or second planned trajectory; determining, as a control trajectory and based at least in part on the bias value, one of the first planned trajectory or the second planned trajectory; and controlling the vehicle in the environment based at least in part on the control trajectory.

H: The one or more non-transitory computer-readable media of paragraph G, wherein determining the bias value is based at least in part on one or more of: vehicle state data of the vehicle, a number of objects within a threshold distance of the vehicle, presence of a construction zone, or a distance between the vehicle and a destination in the environment.

I: The one or more non-transitory computer-readable media of paragraph G or H, the operations further comprising: receiving one of: map data associated with the environment or log data associated with the vehicle; and determining the bias value based at least in part on the map data or the log data.

J: The one or more non-transitory computer-readable media of any of paragraphs G-I, wherein: the second model is a machine learned model that determines the second planned trajectory based at least in part on driving data associated with a human driver.

K: The one or more non-transitory computer-readable media of any of paragraphs G-J, the operations further comprising: determining a first cost to use the first planned trajectory at the future time; and determining a second cost to use the second planned trajectory at the future time, wherein determining the bias value is based at least in part on the first cost and the second cost.

L: The one or more non-transitory computer-readable media of any of paragraphs G-K, wherein: the first model is trained to determine the first planned trajectory based at least in part on a set of costs comprising one or more of: a progress cost, a follow cost, a lane change cost, a blinker cost, an intersection cost, a safety cost, an active object cost, or an inactive object cost, and the second model is trained to determine the second planned trajectory independent of the set of costs.

M: The one or more non-transitory computer-readable media of any of paragraphs G-L, wherein: the vehicle navigates to a destination at a first time; and the bias value changes from a first bias value to a second bias value at a second time based at least in part on a position of the vehicle being within a threshold distance of the destination.

N: The one or more non-transitory computer-readable media of any of paragraphs G-M, wherein: the first cost or the second cost comprises one of: an intersection cost indicating a likelihood for an object in the environment to intersect with the vehicle, a safety cost indicating a level of safety associated with a corresponding trajectory, a progress cost indicating an amount of progress by the vehicle using the corresponding trajectory, or a comfort cost indicating a comfort level for a passenger of the vehicle.

O: The one or more non-transitory computer-readable media of any of paragraphs G-N, wherein: the first model determines the first planned trajectory at approximately a same time as the second model determines the second planned trajectory.

P: The one or more non-transitory computer-readable media of paragraph N, further comprising: receiving vehicle state data associated with the vehicle, the vehicle state data comprising one or more of: position data, orientation data, heading data, velocity data, speed data, acceleration data, yaw rate data, or turning rate data; and determining the bias value based at least in part on the vehicle state data.

Q: A method comprising: determining, by a first model and based at least in part on sensor data from one or more sensors, a first planned trajectory usable to control a vehicle in an environment at a future time; determining, by a second model and based at least in part on the sensor data, a second planned trajectory usable to control the vehicle in the environment at the future time, the second model different from the first model; determining a bias value indicative of a preference for controlling a vehicle according to the first or second planned trajectory; determining, as a control trajectory and based at least in part on the bias value, one of the first planned trajectory or the second planned trajectory; and controlling the vehicle in the environment based at least in part on the control trajectory.

R: The method of paragraph Q, wherein determining the bias value is based at least in part on one or more of: vehicle state data of the vehicle, a number of objects within a threshold distance of the vehicle, presence of a construction zone, or a distance between the vehicle and a destination in the environment.

S: The method of paragraph Q or R, further comprising: receiving one of: map data associated with the environment or log data associated with the vehicle; and determining the bias value based at least in part on the map data or the log data.

T: The method of any of paragraphs Q-S, wherein: the second model is a machine learned model that determines the second planned trajectory based at least in part on driving data associated with a human driver.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:

one or more processors; and one or more non-transitory computer-readable media storing instructions executable by the one or more processors, wherein the instructions, when executed, cause the system to perform operations comprising:

receiving sensor data from a sensor associated with an autonomous vehicle;

determining, by a first model and based at least in part on the sensor data and a set of costs, a first planned trajectory usable to control the autonomous vehicle in an environment at a future time;

determining, by a second model and based at least in part on the sensor data, a second planned trajectory usable to control the autonomous vehicle in the environment at the future time, the second model trained to determine the second planned trajectory independent of the set of costs;

determining a first cost to use the first planned trajectory at the future time;

determining a second cost to use the second planned trajectory at the future time;

determining, by a machine learned model, a bias value associated with a preference for following the first planned trajectory or the second planned trajectory, the bias value determined based at least in part on one or more of: vehicle state data of the autonomous vehicle, a number of objects within a threshold distance of the autonomous vehicle, or presence of a region;

determining, as a control trajectory and based at least in part on the first cost, the second cost, and the bias value, one of the first planned trajectory or the second planned trajectory; and controlling the autonomous vehicle in the environment based at least in part on the control trajectory.

2. The system of claim 1, wherein:

the bias value represents a weight associated with one of: the first cost or the second cost to indicate the preference for following the first planned trajectory or the second planned trajectory, and determining to use one of: the first planned trajectory or the second planned trajectory based at least in part on comparing the first cost, the second cost, and the weight.

3. The system of claim 1, the operations further comprising:

receiving one of: map data associated with the environment or log data associated with the autonomous vehicle; and determining the bias value based at least in part on the map data or the log data.

4. The system of claim 1, the operations further comprising:

determining that the first cost and the second cost are a same value;

identifying, based at least in part on the first cost and the second cost being the same value, a third cost associated with the first planned trajectory and a fourth cost associated with the second planned trajectory; and comparing the third cost associated with the first planned trajectory to the fourth cost associated with the second planned trajectory;

wherein determining, as the control trajectory, the first planned trajectory or the second planned trajectory is based at least in part on comparing the third cost and the fourth cost.

5. The system of claim 1, wherein:

the machine learned model is a first machine learned model;

the second model is a second machine learned model that determines the second planned trajectory based at least in part on driving data associated with a human driver, and the first cost or the second cost comprises one of:

an intersection cost indicating a likelihood for an object in the environment to intersect with the autonomous vehicle, a safety cost indicating a level of safety associated with a corresponding trajectory, a progress cost indicating an amount of progress by the autonomous vehicle using the corresponding trajectory, or a comfort cost indicating a comfort level for a passenger of the autonomous vehicle.

6. One or more non-transitory computer-readable media storing instructions executable by one or more processors, wherein the instructions, when executed, cause the one or more processors to perform operations comprising:

determining, by a first model and based at least in part on sensor data from one or more sensors, a first planned trajectory usable to control a vehicle in an environment at a future time;

determining, by a second model and based at least in part on the sensor data, a second planned trajectory usable to control the vehicle in the environment at the future time, the second model different from the first model;

determining, by a machine learned model, a bias value indicative of a preference for controlling the vehicle according to the first planned trajectory or the second planned trajectory, the bias value determined based at least in part on one or more of: vehicle state data of the vehicle, a number of objects within a threshold distance of the vehicle, or presence of a region;

determining, as a control trajectory and based at least in part on the bias value, one of the first planned trajectory or the second planned trajectory; and controlling the vehicle in the environment based at least in part on the control trajectory.

7. The one or more non-transitory computer-readable media of claim 6, the operations further comprising:

receiving one of: map data associated with the environment or log data associated with the vehicle; and determining the bias value based at least in part on the map data or the log data.

8. The one or more non-transitory computer-readable media of claim 6, wherein:

the machine learned model is a first machine learned model;

the second model is a second machine learned model that determines the second planned trajectory based at least in part on driving data associated with a human driver.

9. The one or more non-transitory computer-readable media of claim 6, the operations further comprising:

determining a first cost to use the first planned trajectory at the future time; and determining a second cost to use the second planned trajectory at the future time, wherein determining the bias value is based at least in part on the first cost and the second cost.

10. The one or more non-transitory computer-readable media of claim 6, wherein:

the first model is trained to determine the first planned trajectory based at least in part on a set of costs comprising one or more of: a progress cost, a follow cost, a lane change cost, a blinker cost, an intersection cost, a safety cost, an active object cost, or an inactive object cost, and the second model is trained to determine the second planned trajectory independent of the set of costs.

11. The one or more non-transitory computer-readable media of claim 6, wherein:

the vehicle navigates to a destination at a first time; and the bias value changes from a first bias value to a second bias value at a second time based at least in part on a position of the vehicle being within a threshold distance of the destination.

12. The one or more non-transitory computer-readable media of claim 9, wherein:

the first cost or the second cost comprises one of:

an intersection cost indicating a likelihood for an object in the environment to intersect with the vehicle, a safety cost indicating a level of safety associated with a corresponding trajectory, a progress cost indicating an amount of progress by the vehicle using the corresponding trajectory, or a comfort cost indicating a comfort level for a passenger of the vehicle.

13. The one or more non-transitory computer-readable media of claim 6, wherein:

the first model determines the first planned trajectory at approximately a same time as the second model determines the second planned trajectory.

14. The one or more non-transitory computer-readable media of claim 12, the operations further comprising:

receiving vehicle state data associated with the vehicle, the vehicle state data comprising one or more of: position data, orientation data, heading data, velocity data, speed data, acceleration data, yaw rate data, or turning rate data; and determining the bias value based at least in part on the vehicle state data.

15. A method comprising:

determining, by a first model and based at least in part on sensor data from one or more sensors, a first planned trajectory usable to control a vehicle in an environment at a future time;

determining, by a second model and based at least in part on the sensor data, a second planned trajectory usable to control the vehicle in the environment at the future time, the second model different from the first model;

determining, by a machine learned model, a bias value indicative of a preference for controlling the vehicle according to the first planned trajectory or the second planned trajectory, the bias value determined based at least in part on one or more of: vehicle state data of the vehicle, a number of objects within a threshold distance of the vehicle, or presence of a region;

determining, as a control trajectory and based at least in part on the bias value, one of the first planned trajectory or the second planned trajectory; and controlling the vehicle in the environment based at least in part on the control trajectory.

16. The method of claim 15, further comprising:

receiving one of: map data associated with the environment or log data associated with the vehicle; and determining the bias value based at least in part on the map data or the log data.

17. The method of claim 15, wherein:

the machine learned model is a first machine learned model;

the second model is a second machine learned model that determines the second planned trajectory based at least in part on driving data associated with a human driver.

18. The method of claim 15, wherein the region is a construction zone.

19. The method of claim 15, wherein the bias value represents a weight indicating the preference for following the first planned trajectory or the second planned trajectory.

20. The method of claim 15, further comprising:

determining a first cost to use the first planned trajectory at the future time; and determining a second cost to use the second planned trajectory at the future time, wherein determining the bias value is based at least in part on the first cost and the second cost.

* * * * *